(No Model.)
D. MILLER.
Apparatus for Cleaning and Dampening Grain.
No. 229,901. Patented July 13, 1880.
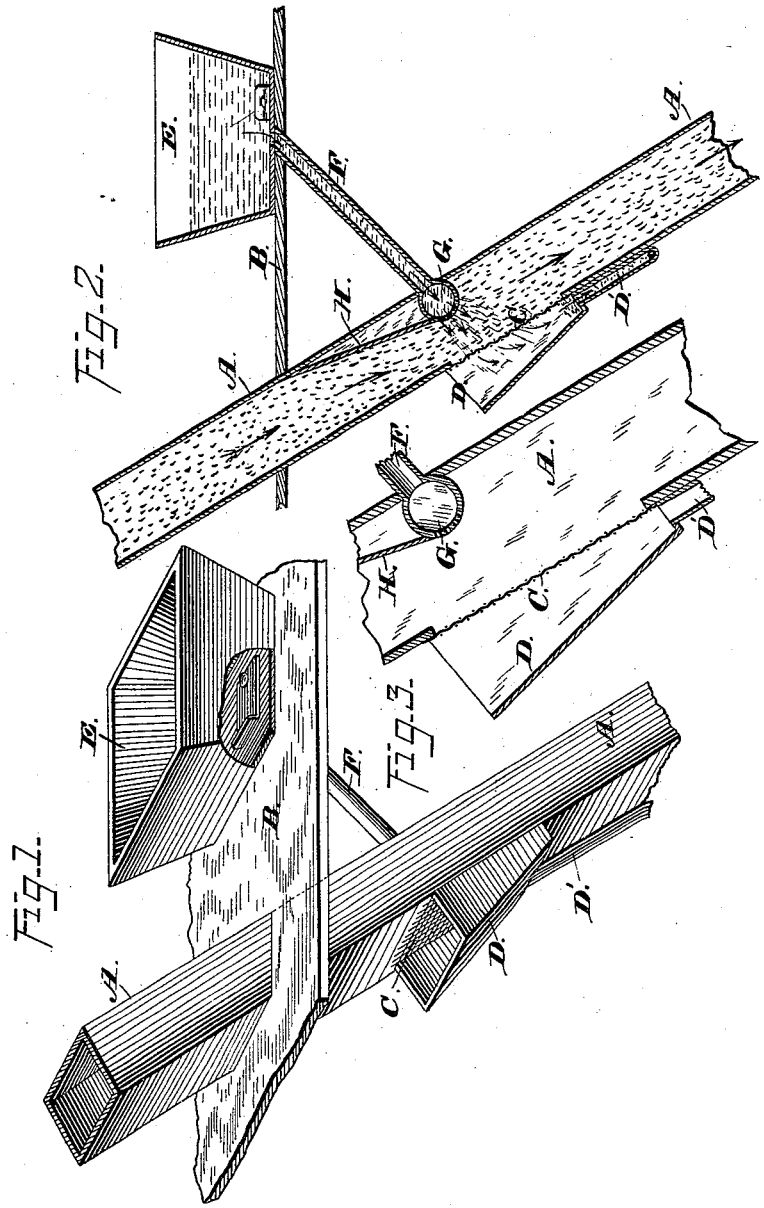

UNITED STATES PATENT OFFICE.

DAVID MILLER, OF MECHANICSBURG, PENNSYLVANIA.

APPARATUS FOR CLEANING AND DAMPENING GRAIN.

SPECIFICATION forming part of Letters Patent No. 229,901, dated July 13, 1880.

Application filed April 5, 1880. (No model.)

*To all whom it may concern:*

Be it known that I, DAVID MILLER, a citizen of the United States, residing at Mechanicsburg, in the county of Cumberland and State of Pennsylvania, have invented new and useful Improvements in Methods and Apparatus for Cleaning and Dampening Grain, of which the following is a specification.

This invention relates to apparatus for cleansing and dampening wheat and other grain for the purpose of carrying off impurities and preparing the grain for decortication.

Heretofore grain has been cleansed and dampened by forcing the grain into a perforated cylinder by means of a screw-conveyer on a hollow shaft, water being passed through the latter into a revolving perforated coiled pipe within the cylinder, through which coiled pipe the water is discharged and thrown among the grain by centrifugal force, the cleansed and dampened grain passing off at one end of the cylinder and the water passing off through the perforations in the latter; further, a water-tank has been arranged to discharge the water upon a body of grain moved horizontally by means of a screw-conveyer in a conveyer-box.

The object of the present invention is to provide means whereby the grain may be effectively cleansed and dampened without the necessity of employing special mechanism for moving the grain while being operated on.

The invention consists, first, in an apparatus for moistening and cleaning grain, a grain-spout leading downwardly through the floors of a building from the grain-supply, and provided in one of its vertical walls with a sieve, and directly below the sieve having a waste-water box, from which leads a waste-pipe, in combination with a spray-pipe connected with an elevated water-reservoir and extending into the grain, and provided with a spraying device arranged to direct the spray transversely through the falling grain; second, in the combination of the spray-box inclosed within the grain-conducting spout with the sieve, spray-box, and a deflecting-plate which deflects the grain in front of the spray-box and prevents its lodging thereon; third, in combining with the grain-conducting spout, having an inclosed spray-box and a sieve, a waste-box in front of the sieve for catching the water as it comes from the spray-box out through the sieve, the waste-box having a suitable waste-spout, all as hereinafter more fully explained.

In the drawings, Figure 1 is a perspective view of the apparatus; Fig. 2, a vertical central section. Fig. 3 is a detail sectional view, showing the waste-box, sieve, and spray-box, portions of the grain-spout being represented as broken away.

The spout or chute A, into which the grain to be cleaned is fed, is supported in an inclined position by suitable joists or floors, as at B, or by means of a platform or any desirable arrangement of frame-work which will maintain it in such position. Joists or bars will also connect with this inclined spout at points lower down, so as to effectively sustain it.

The spout is provided in its under side with an opening, which is covered by a sieve or screen, C, the meshes of which are of proper size to prevent the passage of grain through it. They are, however, open sufficiently to admit of the free passage of water and the impurities which the water carries off from the falling grain.

Secured to the inclined spout, in a position in front of the sieve, is a waste-box, D, which is employed for the purpose of catching the water as it passes out through the sieve; and leading from the waste-box is a waste-pipe, D', which conducts the water from the box.

The tank E, which supplies the water required for the purpose of cleansing the grain, is arranged at such elevation above the level of the sieve as will insure the proper hydraulic pressure for forcing the water through the falling grain and thence out through the sieve into the waste-box D.

The tank may be supported upon the floor B, or it may be held at the elevation required by any other suitable support.

A water-pipe, F, leads from the water-tank into the inclined spout, and terminates at its lower end in a spray-box, G, which is located within the inclined spout at a point opposite the sieve.

The spray-box extends across the spout parallel with the plane of the sieve, and is formed with discharge apertures or perforations arranged to direct the jets of water toward the sieve.

As a means for directing the falling grain so as to insure its passage in front of the spray-box, and also to prevent its lodging thereon, a deflecting-plate, H, is arranged to form an oblique partial partition within the spout. This deflecting-plate extends upward from the spray-box, and inclines so as to unite at its upper edge with the upper wall of the spout, as shown in Fig. 2.

The grain is fed into the upper end of the spout from a suitable hopper, and in descending the jets of water from the spray-box will be forced through it, thus effectively washing and freeing it from smut, dust, and all impurities, which will be carried with the water through the sieve, while the grain will pass on down the spout. In this process the grain will also be dampened, so as to facilitate the process of decortication.

Having thus described my invention, what I claim is—

1. In an apparatus for moistening and cleaning grain, the grain-spout leading downwardly through the floors of a building from the grain-supply, and provided in one of its vertical walls with a sieve, C, and directly below the sieve having a waste-water box, D, from which leads a waste-pipe, D', in combination with a spray-pipe connected with an elevated water-reservoir and extending into the grain, and provided with a spraying device arranged to direct the spray transversely through the falling grain, all substantially as described.

2. In a grain-cleaning apparatus, the combination of the spray-box within the grain-conducting spout, the sieve in one side of the spout opposite to the spray-box, and a deflecting-plate extending up from the spray-box, whereby the grain is deflected in front of the spray-box, substantially as and for the purpose set forth.

3. In a grain-cleaning apparatus, the combination of the grain-conducting spout with an interior spray-box located in one side of the box, opposite the sieve, a waste-box, D, in front of the sieve, and a waste-pipe leading from said waste-box, whereby the water, with the impurities from the grain which pass out through the sieve, will be collected and carried off, substantially as set forth.

In testimony whereof I have hereunto set my hand in the presence of two subscribing witnesses.

DAVID MILLER.

Witnesses:
ANDREW SINYISER,
J. C. HASELET.